Patented Aug. 4, 1925.

1,548,796

UNITED STATES PATENT OFFICE.

FRANCIS O. LIBBY, OF PORTLAND, MAINE, ASSIGNOR TO THE TWITCHELL-CHAMPLIN CO., OF PORTLAND, MAINE, A CORPORATION OF MAINE.

PROCESS OF BAKING BEANS.

No Drawing. Application filed February 7, 1925. Serial No. 7,710.

*To all whom it may concern:*

Be it known that I, FRANCIS O. LIBBY, a citizen of the United States, residing at Portland, county of Cumberland, State of Maine, have invented certain new and useful Improvements in Processes of Baking Beans, of which the following is a specification.

My present invention involves the cooking of legumes and particularly those beans which are prepared for human consumption in certain forms known as baked beans. My invention is of particular importance in the preparation of canned baked beans, although applicable to domestic as well as to commercial cooking of the same.

The value of the bean, of which there are many varieties adapted for human consumption, has been long recognized, and beans have been long a staple article of human diet. The difficulties of properly cooking beans has long been appreciated, but in spite of the fact that the bean could be more digestibly prepared in other ways, there has been a marked preference in most civilized countries for beans cooked so as to preserve their natural form, as against ground beans or stewed beans or beans prepared by other methods, in which the form was wholly or partly lost. This preference or rather demand has imposed difficulties, especially on those preparing beans commercially, as where such beans are canned.

It has long been known that beans contain much indigestible matter. Of these there are the cellulose and part of the starches. The former is not directly useful for food purposes, but the latter is potentially valuable but difficult of reduction to a form for assimilation. In addition to this is the presence of the fibrin which is the important asset of the legumin.

It has been pointed out that the skin of the bean contains a large percentage of undesirable cellulose. In this there is another factor somewhat related but which does not seem to have been recognized or its importance realized. The so-called skin of the bean is an envelop of considerable strength designed by nature to have a resistant protective relation to the interior. In its natural state the skin may be considered as in effect a dializing membrane permeable by water and salts, but not permeable by colloidal or like matter.

In the preparation of baked beans as ordinarily carried out, there is a preliminary soaking and usually parboiling of the beans. After the beans have been so treated the interior is more or less saturated. After the bean is in this condition, in which it is somewhat softened but otherwise substantially unaffected, it is usually cooked in a seasoned liquor intended to impart flavor to the bean while its preparation is being completed.

The cooking changes sought to be accomplished involve a desired change in the starch or portions of it to render it digestible and for this purpose the treatment of the starch by hot water is very important as the starch is not readily affected except by hot water or steam. The bean, even when previously saturated or softened by parboiling, has always been resistant and difficult to cook and particularly slow to take on the desired flavor.

I have discovered that it is possible to simplify the skin membrane so as to make it more readily permeable to cooking juices. Furthermore, I find it possible to cause the bean to absorb these juices more readily than where they were introduced at this stage of the cooking immediately after parboiling, and while substantially saturated.

I effect this double desideratum by a single simple step which I will now proceed to explain, making reference for the purposes of illustration, to a process adapted for producing canned baked beans, although it will be understood that the step may be used in any process for such a cooking.

It is obviously extremely difficult to ascribe an exact theory to such changes as I will now describe, but I will endeavor to interpret my invention by an explanation of a theory which seems to be justified from the results as actually observed.

After the beans have been thoroughly saturated by parboiling, I expose them for a short time to the direct influence of an intense heat. In practice, I pass the beans as a thin layer directly beneath gas burners at temperatures between 350° and 500°, depending on the character of the beans. This intense direct heat seems to change the character of the skin from what may be called a dializing membrane to a simple membrane. In practice, this change should be only partially effected because if carried beyond a certain point, the beans become mushy and lose form so as not to be acceptable to the public. In practice, I find that for canning purposes, where the beans are to be processed in a flavoring liquor, that about three minutes exposure to heat, as above described, sufficiently changes the skin so that the juices can pass through it.

At the same time, by this dry baking I produce another effect which affords a valuable combination with the first result. As before explained, when the beans are introduced into the cooking liquor in their saturated state, there is very little tendency of the bean to absorb the liquor, and the interchange of the flavoring elements of the liquor are very reluctantly effected in the bean. This was one of the reasons for the common supposition that beans, in order to be properly cooked and flavored, must be cooked for a very long time.

During my preliminary dry baking, during which the skin membrane is modified, I also drive off from the softened bean considerable of its water of saturation. When so prepared, they may be introduced into the cooking liquor, so that the bean has an immediate tendency to absorb the juices which effect is now possible whether they be flavorings, fats or other elements, because the bean skin is now apparently rendered colloidally permeable.

The time of dry baking varies somewhat with different kinds of beans. For the so-called Japanese beans, a temperature of about 400° and an exposure of 400° about three minutes seems most efficient for the initial cooking, after which the beans can be processed in the cans with the cooking liquor in about two hours, at a temperature of 240° F., but care must be exercised not to over-process.

Baked beans prepared in accordance with my invention, even where put through in large quantities, as for example, in five ton lots, can be produced with the greatest perfection of flavor and in more digestible condition.

The initial dry baking appears to render the cellulose and particularly the extremely indigestible cellulose of the skin so that it is entirely digestible and the subsequent permeability of the bean, by reason of the changes in the skin, make it possible to secure a high degree of conversion of the indigestible starch to digestible starch.

This permits the digestion of the starch in the stomach, and so relieves the burden on the digestive action of the intestines upon which depend the proper digestion and assimilation of the fibrin, which is the important factor which makes the bean so valuable as a substitute for meat.

My invention is capable of practice in a variety of ways and with a variety of apparatus, most of which is available as present equipment in canning factories. My oven for dry baking may be of any type, from the most simple to more complicated devices where speed and quantity are important factors. Such an oven is shown and described in my co-pending application, Serial No. 694,494, filed February 23, 1924.

What I therefore claim and desire to secure by Letters Patent is:

1. In the method of baking beans, those steps including the preliminary parboiling of the beans and the immediate subsequent step of subjecting them to a direct intensive heat for a relatively short period, whereby to modify the exterior envelope so that the subsequent cooking may be accelerated.

2. In the method of baking beans, those steps including the preliminary saturating of the beans and the immediate subsequent step of subjecting them to a direct intensive heat for a relatively short period, whereby to modify the exterior envelope and subsequently heating the beans in a flavored liquor.

3. The method of preparing canned baked beans, which consists in preliminarily softening the beans with water, in exposing the softened beans as a thin layer and for a relatively short time to an intense heat, in sealing the beans in cans, and in completing the baking of the beans therein while sterilizing the same.

4. The method of preparing canned baked beans, which consists in preliminarily parboiling the beans with water, in exposing the softened beans as a thin layer and for a relatively short time to an intense heat, in sealing the beans in cans with flavoring liquor, and in completing the baking of the beans therein while sterilizing the same.

In testimony whereof I affix my signature in presence of two witnesses.

FRANCIS O. LIBBY.

Witnesses:
    ARTHUR P. CHAMPLIN,
    A. M. MEMSH.